United States Patent [19]

Riquier et al.

[11] Patent Number: 5,685,925
[45] Date of Patent: Nov. 11, 1997

[54] FILLING FOR A PUNCTURE-PROOF PNEUMATIC TIRE

[75] Inventors: Didier Riquier, Persan; Alain Lelievre, Fresnoy; Brahim Ammour, Meru, all of France

[73] Assignee: Hutchinson, Paris, France

[21] Appl. No.: 547,607

[22] Filed: Oct. 24, 1995

[30] Foreign Application Priority Data

Oct. 26, 1994 [FR] France .................................. 94 12804

[51] Int. Cl.$^6$ .............................. B60C 7/00; B60C 7/12
[52] U.S. Cl. .................. 152/157; 152/310; 152/314; 152/316; 152/322
[58] Field of Search .............................. 152/310, 313, 152/314, 322, 311–312, 315, 318, 325, 329, 327–328, 157, 165, 316, 320, 323; D12/134

[56] References Cited

U.S. PATENT DOCUMENTS

| | | |
|---|---|---|
| 2,108,406 | 2/1938 | Kraft . |
| 2,213,028 | 8/1940 | Kraft .................................. 152/165 |
| 2,620,845 | 12/1952 | Lord . |
| 3,127,920 | 4/1964 | Hercules . |
| 5,265,658 | 11/1993 | Riquier et al. .................. 152/322 X |

FOREIGN PATENT DOCUMENTS

| | | |
|---|---|---|
| 104797 | 4/1984 | European Pat. Off. . |
| 2655919 | 6/1991 | France . |
| 754361 | 8/1944 | Germany . |
| 2748886 | 5/1979 | Germany .............................. 152/157 |
| 1766 | 1/1898 | United Kingdom .................. 152/329 |

*Primary Examiner*—Adrienne C. Johnstone
*Attorney, Agent, or Firm*—Bell, Seltzer, Park & Gibson

[57] ABSTRACT

A filling for a puncture-proof pneumatic tire is formed by two half-toruses of elastomer or of rubber which are juxtaposed along an equatorial plane inside a tire cover and which are formed with a plurality of parallel channels of preferably hexagonal cross-section, the channels being parallel and separated from one another and positioned so that the thickness of material between adjacent channels is substantially constant.

8 Claims, 1 Drawing Sheet

FILLING FOR A PUNCTURE-PROOF PNEUMATIC TIRE

The invention relates to a filling for a puncture-proof pneumatic the filling being made of rubber or of elastomer and occupying all the available space inside the tire cover.

BACKGROUND OF THE INVENTION

Tires fitted with such a filling are used mainly on vehicles for transporting or handling heavy loads (military vehicles, public works vehicles, etc) which move at slow speeds (in the range 5 km/h to 15 km/h for example) or at medium speeds (in the range 30 km/h to 50 km/h for example, or greater). The tires must combine qualities of ground holding, elasticity, transverse stiffness, low rolling resistance, and high wear resistance, and it is these qualities which distinguish them from rival products such as flexible solid tires and tires filled with polyurethane foam which are generally very hard and which have a life span shorter than that of a normal tire, tires filled with polyurethane foam also having the drawback of being crushed flat when stopped after a period of use, because polyurethane foam is deformable when hot.

The fillings of the invention are constituted essentially by a toroidal cushion in which airtight channels are formed that extend circumferentially around the axis of the tire and that are filled with gas, in particular air, with the cross-section of the toroidal cushion being of a shape that corresponds to that of the inside face of the tire cover.

One such filling is already known from the Applicants' French patent 2 655 919, in which the channels are of circular cross-section and are disposed in a matrix, being organized in rows and columns that are respectively parallel and perpendicular to the axis of the tire.

OBJECTS AND SUMMARY OF THE INVENTION

An essential aim of the present invention is to improve the performance and the operating lifetime of such fillings.

To this end, the invention provides a filling for a puncture-proof pneumatic tire, in particular for vehicles for transporting and/or handling heavy loads, the filling being designed to occupy substantially all of the internal space available inside a tire cover, and comprising a toroidal cushion of elastomer or of rubber that is formed with a plurality of parallel channels that are airtight and filled with gas, which channels are separated from one another and extend circumferentially around the rotational axis of the filling, wherein the channels are of polygonal cross-section with five or more sides and having rounded vertices, said channels being disposed in a staggered configuration relative to one another and being separated from one another by a substantially constant thickness of material.

It has been observed that this characteristic causes the operating lifetime of the filling to be considerably increased, due to a better distribution of stresses within the material of the filling under load.

In a preferred embodiment of the invention, the channels are hexagonal in cross-section.

This shape makes it possible, in particular, to avoid an excessive pinching effect at the edges of the channels and the "cat's eye" that occurs on compression of the toroidal cushion when the channels are circular in section, the reduction or elimination of the pinching and of the "cat's eye" effect serving to prevent breaks starting in the material of the toroidal cushion.

In a particular embodiment of the invention, the above-mentioned channels are in mutual alignment in planes perpendicular to the rotational axis of the tire or the filling, they are disposed or offset in a staggered configuration in directions parallel to said axis, and they have two sides parallel to the rotational axis of the tire or the filling. The channels may have cross-sections of different dimensions.

This particular disposition of the channels makes it easier to obtain substantially constant thickness of material between adjacent channels and to avoid break starts forming in the filling.

BRIEF DESCRIPTION OF THE DRAWING

The invention will be better understood and other characteristics, details, and advantages thereof will appear more clearly on reading the following description given by way of example and made with reference to the accompanying drawing, in which.

MORE DETAILED DESCRIPTION

Figure 1:
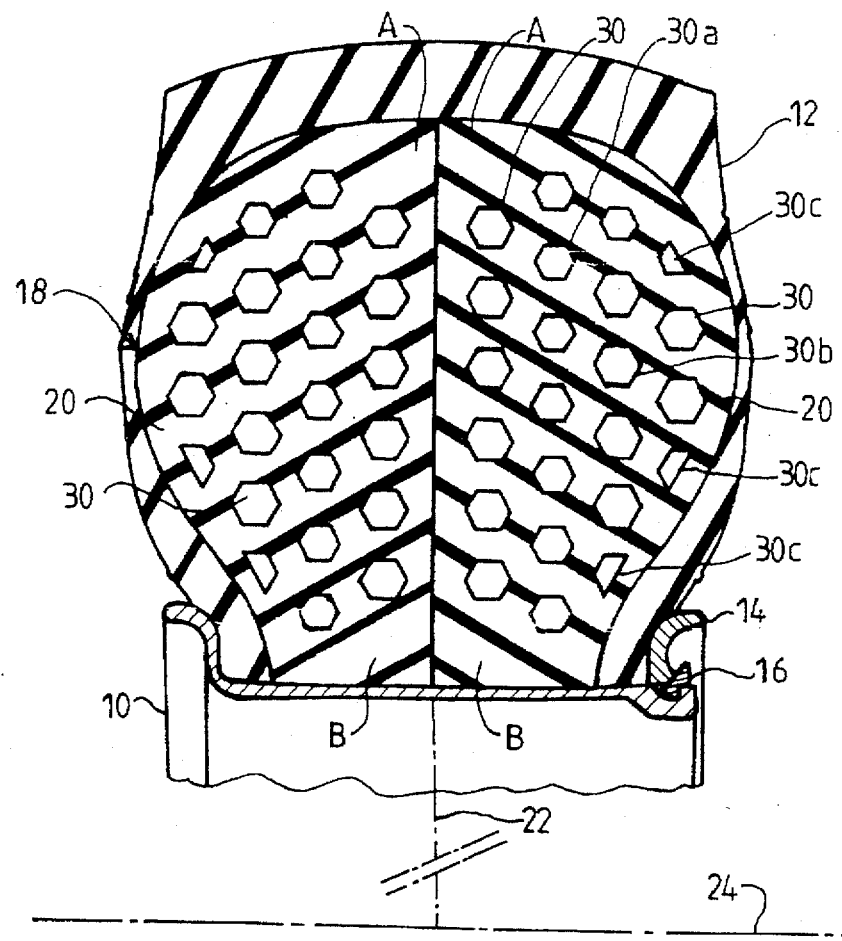
FIG. 1 is a fragmentary diagrammatic cross-section through a wheel fitted with a filling of the invention.
Figure 2:
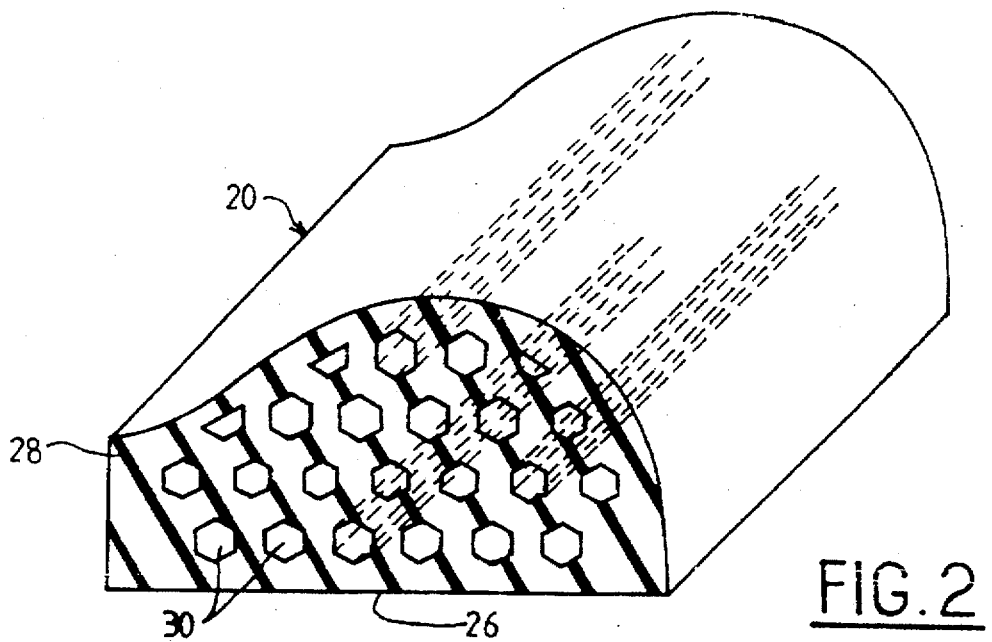
FIG. 2 is a fragmentary diagrammatic perspective view of an element of said filling.

The wheel shown diagrammatically in FIG. 1 is fitted with a filling of the invention and essentially comprises a rim 10 on which a tire cover 12 is mounted by means of annular retaining and locking parts 14, 16, with the space available inside the cover 12 when mounted on the rim 10 being entirely occupied by a filling 18 which is constituted by two identical half-toruses 20 placed face to face and juxtaposed along an equatorial plane or midplane 22 perpendicular to the rotational axis 24 of the wheel or tire.

The half-toruses 20 are fabricated by extruding a mass of raw rubber through an appropriate die, a plane face 26 thereof enabling the mass to be supported without deformation on leaving the die. The extruded mass is then cut to length, and the lengths are placed on toroidally shaped vulcanization platens where the two plane and chamfered ends 28 of each length are united and pressed against each other, after which the resulting vulcanized half-toruses are placed facing each other inside the tire cover 12 on the rim 10.

Advantageously, the two half-toruses 20 are not bonded together (by adhesive or welding), but are merely juxtaposed inside the cover 12, and the junction surfaces of the welded-together ends 28 of the half-toruses 20 are preferably offset relative to each other inside the cover 12.

Each half-torus 20 is formed with parallel longitudinal channels 30 which extend circumferentially around the axis 24 of the tire or of the wheel, these channels 30 being airtight and separated from one another, and being filled with gas, generally air, at normal atmospheric pressure at the time the half-toruses 20 are fabricated.

The channels 30 are shaped and organized inside each half-torus 20 in such a manner that the thickness of material between adjacent channels in a cross-section of the half-torus as shown in FIG. 1 is substantially constant, the thickness of material between the outside peripheral surface of a half-torus and the channels 30 adjacent to said peripheral surface can likewise be substantially constant and equal to the thickness of material between adjacent channels.

Each channel 30 is of polygonal cross-section, in particular hexagonal, and the channels are in mutual alignment in planes perpendicular to the axis 24 of the tire or of the filling, i.e. parallel to the equatorial plane 22 of the wheel, while nevertheless being disposed or offset in a staggered configuration in directions parallel to the axis 24, which makes it easier to obtain the looked-for effect.

For example, and as can be seen clearly in FIG. 1, a channel 30a in a row perpendicular to the axis 24 and lying between two other rows of channels perpendicular to the axis 24 is surrounded by six hexagonal-section channels 30 and is separated from each of them by a substantially constant thickness of material. Similarly, a channel 30b in the following row is likewise surrounded by six hexagonal-section channels 30 which are separated from the channel 30b by a substantially constant thickness of material.

Some of the channels 30 in the vicinity of the outer peripheral surface of the half-torus 20 may be semi-hexagonal in cross-section, i.e. they may be of trapezoid shaped cross-section as shown at 30c, thereby ensuring that they are separated from said outer surface of the half-torus by a thickness of material that is substantially constant and equal to the above-mentioned thickness of material.

In addition, some of the channels 30, such as those in the row perpendicular to the axis 24 and including the above-mentioned channel 30a, may have cross-section dimensions that are slightly smaller than those of the channels in adjacent rows.

A purpose of the channels 30 having a polygonal section with at least five sides, and preferably being hexagonal, is firstly to reduce the "cat's eye" effect which occurs under load at the vertices of the cross-sections of the channels, thereby reducing the rate at which break starts form at said vertices, and secondly to have a thickness of material between adjacent channels that is as constant as possible, which enables stress concentrations and breaks to be avoided in zones of lesser thickness. It also results in an improved dissipation of the heat generated in the filling when in use. The overall effect is an increase in the operating lifetime of the filling.

The portions of the half-toruses 20 that are designated by the letters A and B, i.e. the portions of the half-toruses that are adjacent respectively to the tread of the cover 12 and to the wheel rim 10 have no channels so as to present greater compression strength and avoid the tire sagging in the portions A and B, and also to transmit the driving torque applied to the wheel.

Finally, all of the channels 30 have the same angular disposition in a cross-section of a half-torus 20, with two sides parallel to the axis 24 of the tire or of the wheel, and with no sides parallel to the junction 22 between the half-toruses.

In order to avoid breaks forming under load at the vertices of the polygonal cross-sections of the channels 30, said vertices are rounded with a radius lying in the range 1 mm to 5 mm approximately, depending on the dimensions of the filling and the cross-sections of the channels.

Typically, a filling of the invention, designed to be mounted in a tire cover having a diameter of 8" to 25", i.e. 20.32 cm to 63.5 cm, has about 12 to 65 channels 30 having a cross-sectional area of about 1.24 cm$^2$ to 3.81 cm$^2$. The combined cross-sectional area of all of the channels 30 represents approximately 15% to 25% and preferably about 20% of the cross-sectional area of the filling as a whole.

The dimensions of a filling of the invention when in its free state (not mounted inside a cover 12) are slightly greater than the inside dimensions of the cover 12 to ensure that the filling is under pressure when inside the cover, which pressure is preferably balanced, i.e. the filling is uniformly compressed inside the cover 12. The operating lifetime of the filling and its behavior under load are thus distinctly improved, in particular by increasing its transverse stiffness.

In general manner, the disposition and the shape of the channel 30 in the half-toruses 20 makes it possible to ensure that the stiffness of the half-torus is made uniform in compression, to achieve better distribution throughout the material of the half-toruses of the stresses that result from rolling forces, and to avoid breaks starting as a result of the channels being compressed radially, whereby the operating lifetime of the filling of the invention is considerably greater than that of prior art fillings.

Endurance trials have shown that the operating lifetime of a filling of the invention is about three times greater than that of the tire cover in which it is mounted. In normal conditions, it is thus possible to use a tire containing a filling of the invention until the tire is worn, after which the filling is removed and re-installed in a new tire, the new tire is then used until worn, the filling is removed and is again reinstalled in a new tire, and is used again until the third tire is worn. The cost of a filling of the invention is thus considerably less than that of rival devices of the flexible solid tire type or of the type comprising a tire filled with polyurethane foam.

In addition, fillings of the invention can be designed so that when they are mounted inside tire covers, they give the same flexibility as conventional tires, having a tire pressure lying in the range 2 bars to 10 bars approximately.

The invention is applicable to wheels for vehicles such as goods-handling carts, construction machines, all types of tractors, etc., and in general any military or civil vehicle that is required to operate under difficult conditions and that must retain its ability to move even in the event of a tire cover being punctured, while nevertheless presenting rolling characteristics, in particular flexibility, comparable to those of wheels with ordinary pneumatic tires, with or without inner tubes.

We claim:

1. A filling for a puncture-proof pneumatic tire, the filling being designed to occupy substantially all of the internal space available inside a tire cover, and comprising a toroidal cushion of elastomer or of rubber that is formed with a plurality of parallel channels that are airtight and filled with gas, which channels are separated from one another and extend circumferentially around the rotational axis of the filling, wherein the channels are of polygonal cross-section with five or more sides and having rounded vertices, said channels being disposed in a staggered configuration relative to one another and being separated from one another by a substantially constant thickness of material.

2. A filling according to claim 1, wherein the channels are of hexagonal cross-section.

3. A filling according to claim 2, wherein the channels have the same angular orientation in a cross-section of the filling with two sides parallel to the rotational axis of the filling.

4. A filling according to claim 1, wherein the channels are in mutual alignment in planes perpendicular to the rotational axis of the filling and are disposed or offset in a staggered configuration in directions parallel to said axis.

5. A filling according to claim 1, wherein the channels have cross-sections of different dimensions.

6. A filling according to claim 1, wherein the combined cross-sectional area of all the channels represents about 15% to 25% of the cross-sectional area of the filling as a whole.

7. A filling according to claim 1, wherein it is made up of two half-toruses juxtaposed along an equatorial plane or midplane perpendicular to the rotational axis of the filling.

8. A puncture-proof pneumatic tire mounted on a rim and comprising a tire cover the internal space of which is substantially occupied by a filling, the filling comprising a toroidal cushion of elastomer or of rubber that is formed with a plurality of parallel channels that are airtight and filled with gas, which channels are separated from one another and extend circumferentially around the rotational axis of the filling, the channels being of polygonal cross-section with five or more sides and having rounded vertices, said channels being disposed in a staggered configuration relative to one another and being separated from one another by a substantially constant thickness of material, wherein, in its free state, the filling has dimensions greater than the inside dimensions of the tire cover in order to be in compression when it is installed inside the cover.

* * * * *

UNITED STATES PATENT AND TRADEMARK OFFICE
CERTIFICATE OF CORRECTION

PATENT NO. : 5,685,925

DATED : November 11, 1997

INVENTOR(S) : Didier Riguier et al.

It is certified that error appears in the above-identified patent and that said Letters Patent is hereby corrected as shown below:

Column 1, line 5, after "pneumatic" insert -- tire, --.

Signed and Sealed this

Nineteenth Day of May, 1998

Attest:

BRUCE LEHMAN

Attesting Officer

Commissioner of Patents and Trademarks